March 5, 1968     S. BÖHLER     3,371,650

MEANS TO POSITION AND DRIVE WORK SUPPORT

Filed Dec. 27, 1966     2 Sheets-Sheet 1

Siegfried Boehler
INVENTOR.

BY W S Thompson

United States Patent Office 3,371,650
Patented Mar. 5, 1968

3,371,650
MEANS TO POSITION AND DRIVE WORK SUPPORT
Siegfried Böhler, Balzers, Heiligwies, Liechtenstein, assignor to The Bendix Corporation, Rochester, N.Y., a corporation of Delaware
Filed Dec. 27, 1966, Ser. No. 605,056
Claims priority, application Switzerland, Dec. 31, 1965, 18,168/65
4 Claims. (Cl. 118—503)

ABSTRACT OF THE DISCLOSURE

The adjusting apparatus according to the invention is for the remote adjustment of the spatial location of an object or part to be treated in an unaccessible location as in a vacuum chamber. The apparatus includes a carrier plate for the object or part to be treated which is rotatable about two different axes and is characterized by a flexible shaft which is provided for the transfer of the rotary motion about a first axis perpendicular to the carrier plate and a drive mechanism for pivoting the carrier plate into an arbitrary inclined position about a second axis perpendicular to the first axis. One end of the flexible cable is mounted to move freely in the longitudinal direction, either in an axial hole in a drive shaft or in the carrier plate.

A preferred form of performing the invention is provided in which the flexible shaft is led between two guide plates and the carrier plate is made plate-shaped and is mounted in bearings in a frame swingable about an axis parallel to the plane of the plate and which is connected to drive means for the adjustment of the inclined location of the frame.

Brief summary of invention

The adjusting apparatus can be used for the adjustment of the location in space of parts to be treated in a vacuum chamber, for example, in order to evaporate onto an object at a specified angle in a vacuum evaporation equipment or to be able to expose it to electron or iron beams. An apparatus is known from the German Patent No. 1,165,900 in which the carrier plate for electron microscope preparations, which should be subjected to a so-called oblique evaporation, is arranged on a lift platform, rotatable about at least two axes in space. In particular, in this known apparatus, the carrier plate is rotatable about an axis perpendicular to its deposit surface and about an axis lying in the plane of the deposit surface and a separate adjusting mechanism is provided for displacement of the lift platform for the rotation of the carrier plate. In practical use this known apparatus has proved to be susceptible to interruptions on account of its complicated mechanism and it needs much adjustment to its operation. It is an object of the present invention to specify a new method of construction of such an apparatus which guarantees a greater reliability in use with a smaller cost of construction.

Drawings

Figure 1:
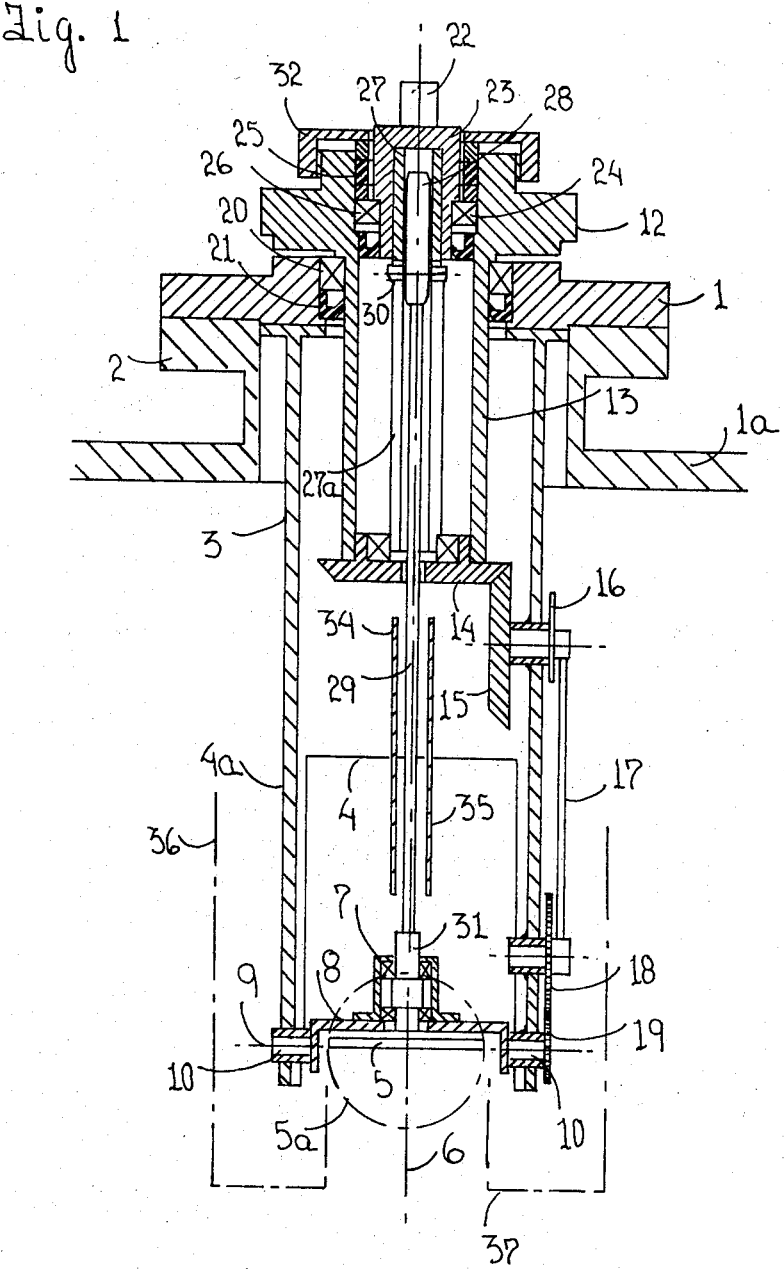
FIGURE 1 is a section view of my adjusting apparatus.

The accompanying drawing shows an example of the carrying out of the invention. The apparatus, according to the drawing, is built up on a flange 1 and can be connected to any vacuum chamber 1a that has a flange 2. The flange 1 carries a support tube 3 that shows two cutouts on its lower end so that two supports 4a and 4b are produced. The carrier plate 5 for the object to be treated is rotatable about an axis 6 perpendicular to it and is mounted by means of ball bearings 7 in the holder frame 8. The frame 8, in its turn, is swingable about the axis 9 and is carried by means of the two pivots 10 from the supports 4a and 4b.

The swing position of the frame 8 and thereby the carrier plate 5 can be arbitrarily adjusted in a range of angles of ±90 degrees from the normal position, as drawn, by means of gearing consisting of the parts 12 to 19.

This gearing consists of a rotating piece 12, the tubular shaft 13, the bevel gears 14 and 15, the eccentric wheel 16, the connecting rod 17 and the further gears 18 and 19 where the latter is immediately positioned on the shaft pivot 10 of the swingable frame 8.

A swing position of the carrier plate 5 which deviates from the normal position drawn by an angle of 90 degrees is indicated in FIGURE 1 with the broken line 5a. The rotatable cylindrical part 13 projecting into the vacuum is mounted on the flange 1 by means of the ball bearing 20 and is sealed in a known manner through the vacuum tight ring seal 21.

For the transfer of a rotary motion to the carrier plate 5 about the axis 6, a second rotary lead through which the remote drive shaft 22 is provided. This is connected to the part 23 which, in turn, is mounted by means of the ball bearing 24 in a hole in part 12 and is sealed by the stuffing box packing 25 and the vacuum tight ring seal 26. The part 23 carries the guiding sleeve 27 in which the end piece 28 of a flexible shaft 29 can slide freely in the longitudinal direction, while it is connected on its lower end with the stub shaft 31 of the carrier plate 5. (The flexible shaft, on the other hand, can be fixed on its upper end and be free to move at its lower end.)

The cross pin 30 is provided to enforce a rotary motion of the shaft which is movable in the slots 27a of the guiding sleeve 27 in the longitudinal direction, but by this will follow the rotary motion. A flexible shaft with a casing may be used or as in the execution example, one without a casing which, in order to avoid a sidewise bending out toward the bevel gear 15, is led between the two guide plates 34–35.

Figure 2:
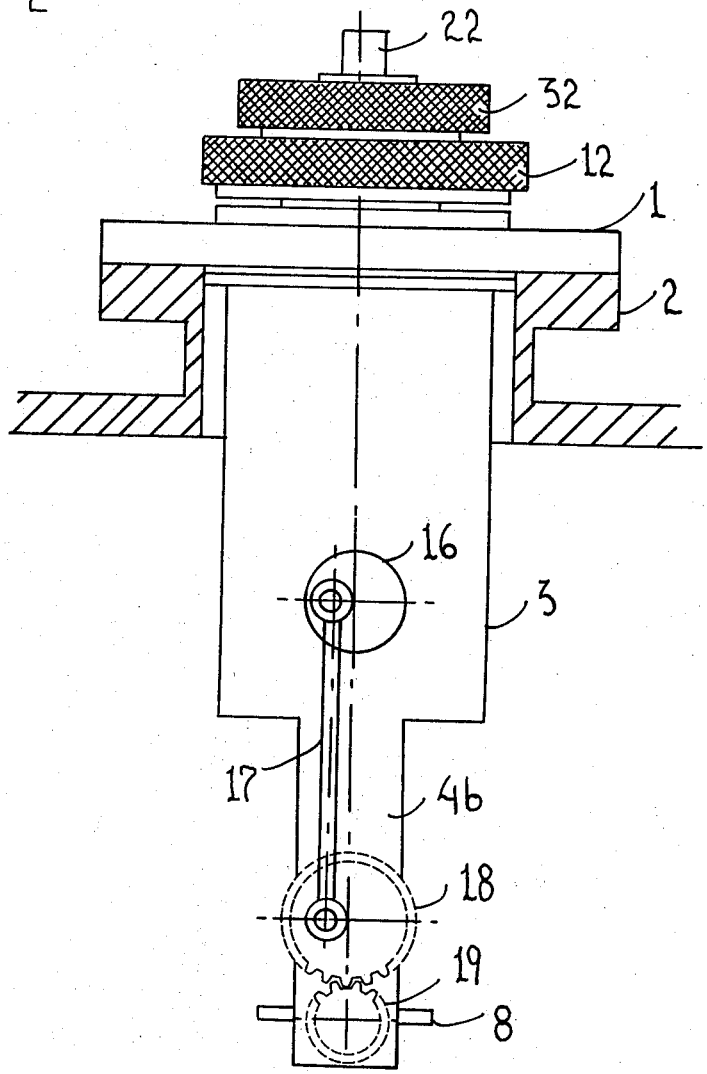
FIGURE 2 is a side view illustrating externally-mounted drive mechanism linkage.

A rotary motion about the axis 6 of the carrier plate 5 for the object to be treated in the vacuum can be transferred with the described apparatus in arbitrary swing positions of the same where this position of swing can also be changed during the treatment. The swinging motion can be coupled with the rotary motion; for this, the stuffing box packing is pressed together so hard by a cap 32 which is engaged on an outside thread on the part 12 that the part 12 is carried along by the rotation of the shaft 22 in consequence of the friction. In this way, the object which is fastened to the carrier plate 5 can be subjected to a continuous and simultaneous rotational and swinging motions during the treatment by a single drive on the shaft 22 as is necessary, for example, for the so-called cone evaporation preparation for electron microscopy. Through the appropriate choice of the point attachment of the connecting rod 17, FIGURE 2, on the eccentric wheel 16 any arbitrary swing angle range between 0 and 90 degrees can be obtained.

Many times it is expedient to shield the described apparatus from the treatment to be carried out in the vacuum chamber with a shield 36 which is represented by the dotted line and to leave open only a window 37 before the carrier plate 5 for the object to be treated. This shield can be cooled or heated according to what is most expedient for the treatment to be carried out.

I claim:
1. In an adjusting apparatus for positioning a work table in an unaccessible location:

a carrier plate means forming a work table adapted to receive an object or part to be treated, said carrier plate rotatable about two different axes, one perpendicular and one parallel to the plane of the carrier plate;

a drive mechanism connected to said carrier plate means operative to rotate said carrier plate means about the axis parallel to the plane of the carrier plate means;

wherein the improvement comprises:

a flexible shaft having a first and second end, one of which is connected to said carrier plate means for rotating said carrier plate means about its perpendicular axis;

a remote drive shaft connected to the other of of said first and second ends of said flexible shaft to impart rotary motion thereto; and one of said first and second ends of said flexible shaft mounted to move freely in a longitudinal direction while transmitting rotary motion.

2. In an adjusting apparatus as claimed in claim 1 the improvement further comprises:

guide means disposed about the axial extent of said flexible cable to confine said cable.

3. In an adjusting apparatus as claimed in claim 1 wherein:

said carrier plate means includes a carrier plate member in the form of a plate and a frame swingable about an axis parallel to said carrier plate member, said carrier plate member rotatably mounted in said frame for rotation about its perpendicular axis.

4. In an adjusting apparatus as claimed in claim 1 including:

means coupling said drive mechanism and said drive shaft to provide coordinated motion of said carrier plate means about both axes.

References Cited

UNITED STATES PATENTS

| | | | |
|---|---|---|---|
| 1,338,782 | 5/1920 | Lindahl | 118—56 X |
| 2,446,476 | 8/1948 | Huebner | 118—53 |
| 2,631,551 | 3/1953 | Lawrence et al. | 64—4 X |
| 2,770,557 | 11/1956 | Atti | 118—56 X |
| 3,031,339 | 4/1962 | Regan et al. | 118—53 X |
| 3,046,157 | 7/1962 | Nyman. | |
| 3,131,917 | 5/1964 | Gessner et al. | 118—59 X |
| 3,297,475 | 1/1967 | Flacche | 118—53 X |

MORRIS KAPLAN, *Primary Examiner.*